United States Patent
Hwang et al.

(10) Patent No.: US 9,796,021 B2
(45) Date of Patent: Oct. 24, 2017

(54) METHOD OF FABRICATING A POROUS METAL SUBSTRATE STRUCTURE FOR A SOLID OXIDE FUEL CELL

(71) Applicant: Institute of Nuclear Energy Research Atomic Energy Council, Executive Yuan, Taoyuan County (TW)

(72) Inventors: Chang-Sing Hwang, Taoyuan County (TW); Chun-Huang Tsai, Taoyuan County (TW); Jen-Feng Yu, Taichung (TW); Chun-Liang Chang, Yunlin County (TW); Jun-Meng Lin, Taipei (TW); Shih-Wei Cheng, New Taipei (TW)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 198 days.

(21) Appl. No.: 14/749,370

(22) Filed: Jun. 24, 2015

(65) Prior Publication Data
US 2016/0167135 A1   Jun. 16, 2016

Related U.S. Application Data

(62) Division of application No. 13/178,662, filed on Jul. 8, 2011, now Pat. No. 9,093,691.

(30) Foreign Application Priority Data

Jul. 23, 2010 (TW) .............................. 099124324 A

(51) Int. Cl.
*H01M 4/88* (2006.01)
*B22F 5/10* (2006.01)
(Continued)

(52) U.S. Cl.
CPC .............. *B22F 5/10* (2013.01); *B22F 3/1017* (2013.01); *B22F 3/114* (2013.01); *B22F 3/1143* (2013.01);
(Continued)

(58) Field of Classification Search
USPC ............................................ 427/58, 115, 212
See application file for complete search history.

(56) References Cited

U.S. PATENT DOCUMENTS

| 2006/0113034 A1* | 6/2006 | Seabaugh ........... H01M 8/1246 156/308.2 |
| 2010/0098996 A1* | 4/2010 | Hwang ............... H01M 4/8621 429/454 |
| 2011/0287340 A1* | 11/2011 | Mougin .................... C25B 9/00 429/514 |

* cited by examiner

*Primary Examiner* — Brian K Talbot
(74) *Attorney, Agent, or Firm* — Locke Lord LLP; Tim Tingkang Xia, Esq.

(57) ABSTRACT

The disclosure provides a porous metal substrate structure with high gas permeability and redox stability for a SOFC and the fabrication process thereof, the porous metal substrate structure comprising: a porous metal plate composed of first metal particles; and a porous metal film composed of second metal particles and formed on the porous metal plate; wherein the porous metal plate has a thickness more than the porous metal film, and the first metal particle has a size more than the second metal particle. Further, a porous shell containing Fe is formed on the surface of each metal particle by impregnating a solution containing Fe in a high temperature sintering process of reducing or vacuum atmosphere, and the oxidation and reduction processes. The substrate uses the porous shells containing Fe particles to absorb the leakage oxygen.

11 Claims, 5 Drawing Sheets

(51) Int. Cl.
*C04B 35/47* (2006.01)
*H01M 8/1226* (2016.01)
*B22F 3/10* (2006.01)
*B22F 3/11* (2006.01)
*B22F 3/26* (2006.01)
*B22F 5/00* (2006.01)
*H01M 8/124* (2016.01)
*B22F 3/24* (2006.01)

(52) U.S. Cl.
CPC ............... *B22F 3/26* (2013.01); *B22F 5/006* (2013.01); *C04B 35/47* (2013.01); *H01M 8/1226* (2013.01); *B22F 2003/241* (2013.01); *B22F 2201/20* (2013.01); *B22F 2301/35* (2013.01); *B22F 2998/10* (2013.01); *C04B 2235/3225* (2013.01); *C04B 2235/3227* (2013.01); *H01M 2008/1293* (2013.01); *Y02E 60/521* (2013.01); *Y02E 60/525* (2013.01)

METHOD OF FABRICATING A POROUS METAL SUBSTRATE STRUCTURE FOR A SOLID OXIDE FUEL CELL

CROSS-REFERENCE TO RELATED APPLICATIONS

This application is a divisional application of U.S. patent application Ser. No. 13/178,662, filed Jul. 8, 2011, now U.S. Pat. No. 9,093,691 entitled "POROUS METAL SUBSTRATE STRUCTURE FOR A SOLID OXIDE FUEL CELL," which itself claims priority under 35 U.S.C. §119(a) on Patent Application No. 099124324 filed in Taiwan (R.O.C.) on Jul. 23, 2010. Each of the above disclosures is incorporated by reference in its entirety.

TECHNICAL FIELD

The present disclosure relates to a solid oxide fuel cell (SOFC), and more particularly, to a porous metal substrate structure for a SOFC.

TECHNICAL BACKGROUND

Recently the solid oxide fuel cell (SOFC) has been a promising means of converting chemical energy into electrical energy by an electro-chemical mechanism. Usually in the conventional SOFC, the Yttria Stabilized Zirconia (YSZ) is used as the electrolyte, the cermet composed of nickel (Ni) and YSZ is used as the anode, and the perovskite composed of LaMnO3 is used as the cathode.

When the SOFC works in a high-temperature environment, the anode fuel, H2, may somehow be suddenly interrupted, such that the air may get into the anode of the fuel cell. Since Ni, the metal catalyst in the fuel, will be oxidized with its volume increased and its expansion coefficient changed, the anode of the SOFC tends to be broken into pieces.

Consequently, there were ways to promote the redox stability of solid oxide fuel cell. La0.75Sr0.25Cr0.5Mn0.5O3 (LSCM) has been proposed as one option for the anode material of the SOFC to have improved anode redox stability. However, the catalytic conversion efficiency of LSCM is less than that of Ni and also LSCM is not a good conductor for oxygen (O) ions, therefore, the polarization resistance of LSCM anode is not low enough.

Moreover, to increase the anode redox stability of a solid oxide fuel cell, it is disclosed that another nickel oxide (NiO) or oxidation barrier (Journal of The Electrochemical Society, 153(10), A1929, 2006) layer is coated on the metal substrate. The NiO particle in this layer has a size less than the NiO particles in the anode, and is to be reduced to a porous Ni layer when the full cell is in normal working conditions. The porous Ni layer tends to be re-oxidized more easily, so as to absorb abnormal oxygen leak to improve redox stability of the anode of a solid oxide fuel cell. However, the permeability of fuel gas decreases accordingly.

In the method mentioned above, the thickness of Ni active layer for improving redox stability of solid oxide fuel cell is smaller than the thickness of the support for solid oxide fuel cell. If the microstructure of the support for solid oxide fuel cell can be modified so that fuel gas (for example, hydrogen) can still pass through the support easily, but the oxygen from leakage can be more effectively absorbed in the longer gas channels of the metal support, then the redox stability improvement will be significantly improved.

TECHNICAL SUMMARY

It is one object of the present invention to provide a porous metal supporting substrate structure with improved gas permeability by acid etching method.

It is another object of the present invention to provide a porous metal supporting substrate structure with improved anode redox stability for supporting a SOFC.

It is another object of the present invention to provide a porous metal supporting substrate with a surface region that is more porous than the inside of porous metal supporting substrate, hence the stress due to the thermal expansion mismatch between porous metal supporting substrate and the functional layers coated on the porous metal supporting substrate can be reduced to a satisfied level.

It is another object of the present invention to provide a combination of porous metal supporting substrate and a redox stable functional layer coated on the porous metal supporting substrate. This combination provides enhanced stability of anode redox for the SOFC application.

According to one aspect of the present disclosure, one embodiment provides a porous metal substrate structure with high gas permeability and redox stability for a SOFC comprising: a porous metal plate composed of first metal particles; and a porous metal film composed of second metal particles and formed on the porous metal plate; wherein the porous metal plate has a thickness more than the porous metal film, and the first metal particle has a size more than the second metal particle.

According to another aspect of the present disclosure, another embodiment provides a method for fabricating a porous metal substrate structure to support functional layers of a SOFC comprising: providing first metal particles or a first metal slurry formed of the first metal particles, second metal particles or a second metal slurry formed of the second metal particles, and a solution containing Fe, wherein the first metal particle has a size more than the second metal particle; forming a porous metal plate with the first metal particles or the first metal slurry by a sintering process; impregnating the solution containing Fe into the porous metal plate by a vacuum means, and then sintering the impregnated porous metal plate at a temperature higher than 1100° C. in a reducing or vacuum atmosphere, until the content of Fe in the porous metal plate reaches about from 6 wt % to 15 wt %; sanding and acid eroding surface of the porous metal plate; coating the second metal particles on the porous metal plate by a powder covering means or pasting the second metal slurry on the porous metal plate, and then sintering the second metal particles or the dried second metal slurry onto the porous metal plate at a temperature higher than 1100° C. to form a porous metal film on the porous metal plate; forming a porous metal substrate with the Fe impregnated porous metal plate and the porous metal film, and acid eroding the porous metal substrate so as to increase its gas permeability to be larger than 3 Darcy; and oxidizing the porous metal substrate so as to shrink its pore sizes.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following.

Figure 1:
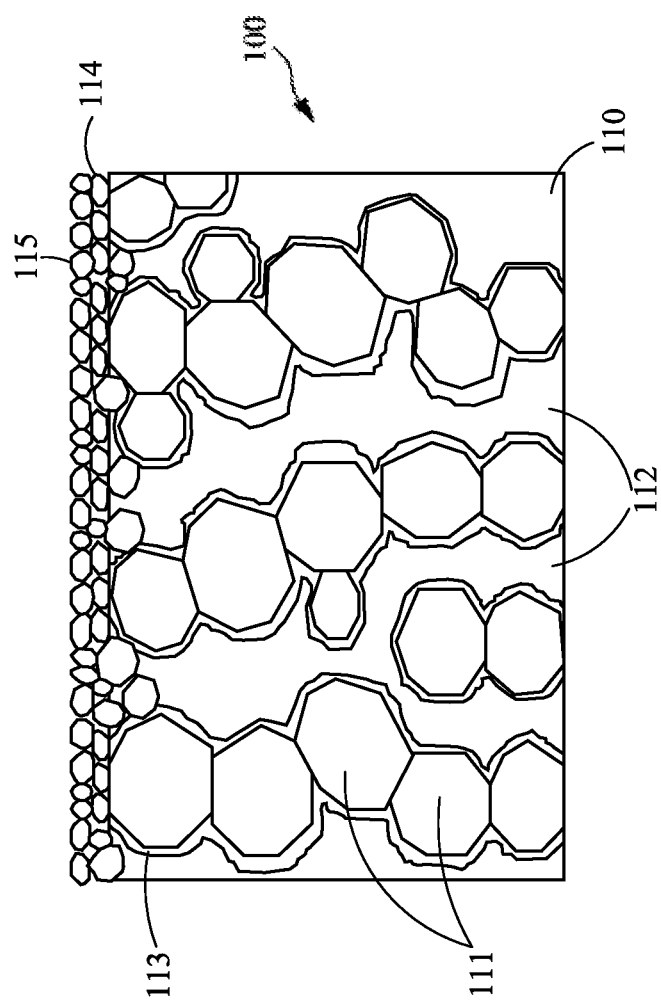
FIG. 1 is a schematic diagram showing the architecture of a porous metal substrate structure for supporting the functional layers of a SOFC according to an embodiment of the present invention.

Please refer to FIG. 1, which is a schematic diagram showing the architecture of a porous metal substrate structure for supporting the functional layer of a SOFC according to an embodiment of the present disclosure. The porous metal substrate 100 is composed of a porous metal plate 110 and a porous metal film 114, wherein the porous metal plate 110 comprises first metal particles 111, gas channels 112, and a porous shell 113. The first metal particles 111 are composed of a first Ni—Fe mixture. The gas channels 112 are the gaps between the first metal particles 111, whereby gas is able to permeate though the porous metal substrate 100. The porous shell 113 is formed on the surface of each of the first metal particles 111. The porous shell 113 contains a third Ni—Fe mixture, in which the Fe content of the third Ni—Fe mixture is richer than the Fe content of the first Ni—Fe mixture. The porous metal film 114 formed of second metal particles 115 is on the porous metal plate 110, wherein the second metal particles 115 are composed of Ni or a second Ni—Fe mixture, and the second metal particles 115 are smaller than the first metal particles 111. The porous shells 113 are capable of absorbing oxygen to have the improved redox stability of SOFC anode. The iron-nickel alloy inside the first metal particles 111 may be capable of improving the mechanic strength of the porous metal plate 110. Wherein, the porous metal plate 110 has a thickness more than the porous metal film 114, and the first metal particle 111 has a size more than the second metal particle 115.

In the other words, the porous metal supporting substrate 100 has the thick porous metal plate 110 and the thin porous metal film 114 on the porous metal plate 110. The metal particles of the porous metal plate 110 have porous shells 113 on their surfaces. These porous shells 113 containing iron (Fe) and nickel (Ni) particles are capable of absorbing oxygen by the oxidation of iron and nickel particles at fuel cell operation temperatures when there is a loss of hydrogen fuel and a leakage of oxygen into the anode of a solid oxide fuel cell. In addition, the metal particles of the porous metal plate 110 contain a mixture of Ni and Fe, so that the mechanic strength of the porous support substrate can be increased.

Figure 2A:
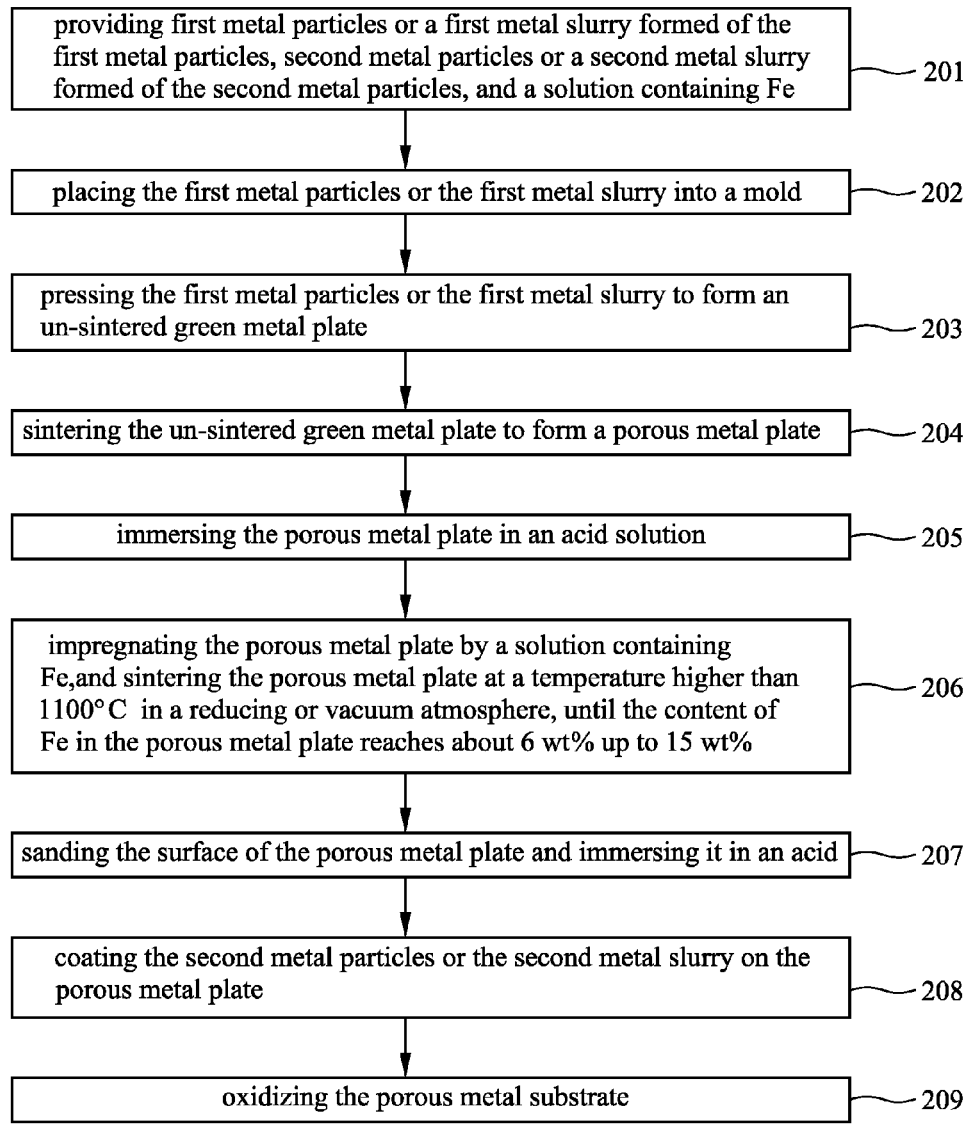
FIG. 2A is a flowchart of a fabricating method of the porous metal substrate structure for supporting the functional layers of a SOFC according to another embodiment of the present invention.

Referring to FIG. 2A, a flowchart of a fabricating method of the porous metal substrate for supporting the functional layers of a SOFC is schematically shown according to another embodiment of the present disclosure. In Step 201, first metal particles or a first metal slurry formed of the first metal particles, second metal particles or a second metal slurry formed of the second metal particles, and a solution containing Fe are provided, wherein the first metal particle has a size more than the second metal particle; for example, the first metal particle may have a diameter of about 60 μm to 250 μm. The material of the first metal particles can be nickel, for example. The second metal particle has a diameter of about 20 μm to 60 μm, and the material of the second metal particles can be nickel too. The first and second metal slurries are composed of organic binder, solvent and metal particles, wherein the organic binder can be polyvinyl alcohol or ethyl cellulose and the solvent can be water or α-terpineol. In the embodiment, the first metal particles are larger than the second metal particles. Furthermore, the second metal particles can also be composed of nickel, a Ni—Fe mixture, or a Ni—Co—Fe—Cu mixture. For improving its catalytic performance at high temperature, other metal particles like Pd and Ru can be added therein. The solution containing iron (Fe) is a mixture of alcohol, iron nitrate ($Fe(NO_3)_3$) and fine iron oxide ($Fe_2O_3$ or $Fe_3O_4$, for example) particles with size less than 5 μm, or preferably, in a nano-scale size.

In Step 202, the first metal particles or the first metal slurry is placed into a mold. In the embodiment, the mold is made of graphite and has a depth of from 1.0 mm to 1.5 mm, a length of from 103 mm to 108 mm, and a width of from 103 mm to 108 mm, but is not limited thereby, which can be made of another high-temperature-resistant material. Before the first metal particles or the first metal slurry is placed into the mold, a layer of fine carbon black is coated on the inside surface of the mold to facilitate afterward mold release. In Step 203, the first metal particles or the first metal slurry being dried in the mold is pressed with a pressure less than 150 MPa to form an un-sintered green metal plate. In Step 204, the un-sintered green metal plate is vacuum sintered or is sintered in reducing atmosphere or is vacuum hot-press sintered at a temperature larger than 1100° C. for 2 to 6 hours to form a porous metal plate. In the case of using the first metal slurry, the un-sintered green plate obtained from the first metal slurry can also be sintered directly without placing into a mold.

The step 204 is to make a porous nickel metal plate that can be impregnated by the solution containing iron (Fe) in next steps, if the first metal particles are nickel particles. The formed porous nickel metal plate has a thickness in the range from 1 mm to 1.25 mm and an area in the range from 101×101 cm² to 103×103 cm².

In Step 205, the porous metal plate after Step 204 is immersed in an acid solution to increase gas-permeability of the porous nickel metal plate to more than 3 Darcy. In this embodiment, 5% nitric acid ($HNO_3$) is used to erode the Ni plate, but is not limited thereby. To enhance the erosion rate, the acid solution can be heated to a temperature higher than the room temperature or the acid solution can be placed in an ultrasonic bath. In Step 206, the porous metal plate after Step 205 is vacuum impregnated by a solution containing iron (Fe). Then the impregnated porous nickel metal plate is sintered at a temperature higher than 1100° C. in a reducing or vacuum atmosphere. This step is repeated until the content of Fe in the porous metal plate reaches about 6 wt % up to 15 wt %.

In Step 207, the surface of the Fe impregnated porous nickel metal plate is sanded, and is immersed in an acid, for example, in 5% $HNO_3$. In Step 208, the second metal particles or the second metal slurry is coated on the porous metal plate after Step 207, and then sintered in a reducing or vacuum atmosphere at a temperature of higher than 1100° C. to form a porous nickel metal film on the porous nickel metal plate, if the first and the second metal particles are nickel. The porous nickel metal substrate composed of an iron impregnated porous nickel plate and a porous nickel metal film is then immersed in 5% $HNO_3$ solution to clean the surface and enhance the permeability of the porous metal substrate. The porous metal film has a thickness less than 100 μm and has surface pores less than 50 μm before oxidation. The second metal particles or the second metal slurry used to form the porous metal film can be Ni particles or Ni—Fe mixture particles with Fe content in the range from 6 to 50 wt %. In the Step 208, the other metal particles composed of Cu, Co, Pd or Ru, or their mixtures thereof can be further added into to form the porous metal film with a better performance of converting hydrocarbon fuel into hydrogen. The coating methods in the Step 208 include powder covering and slurry pasting methods. In Step 209, the porous nickel metal substrate is oxidized at a temperature less than 800° C. in the standard atmosphere for one hour to shrink the surface pores of the porous metal film to less than 35 μm.

After Step 209, to form a porous shell containing Fe on the surfaces of the metal particles in the prepared porous metal substrate, the oxidized porous metal substrate is treated in a reduction atmosphere at a temperature higher than 700° C. The porous shell contains Ni and Fe elements, but Fe elements are rich in the porous shell. After finishing all steps including the reduction process, the porous metal substrate has a gas-permeability of 2 to 5 Darcy.

Figure 2B:
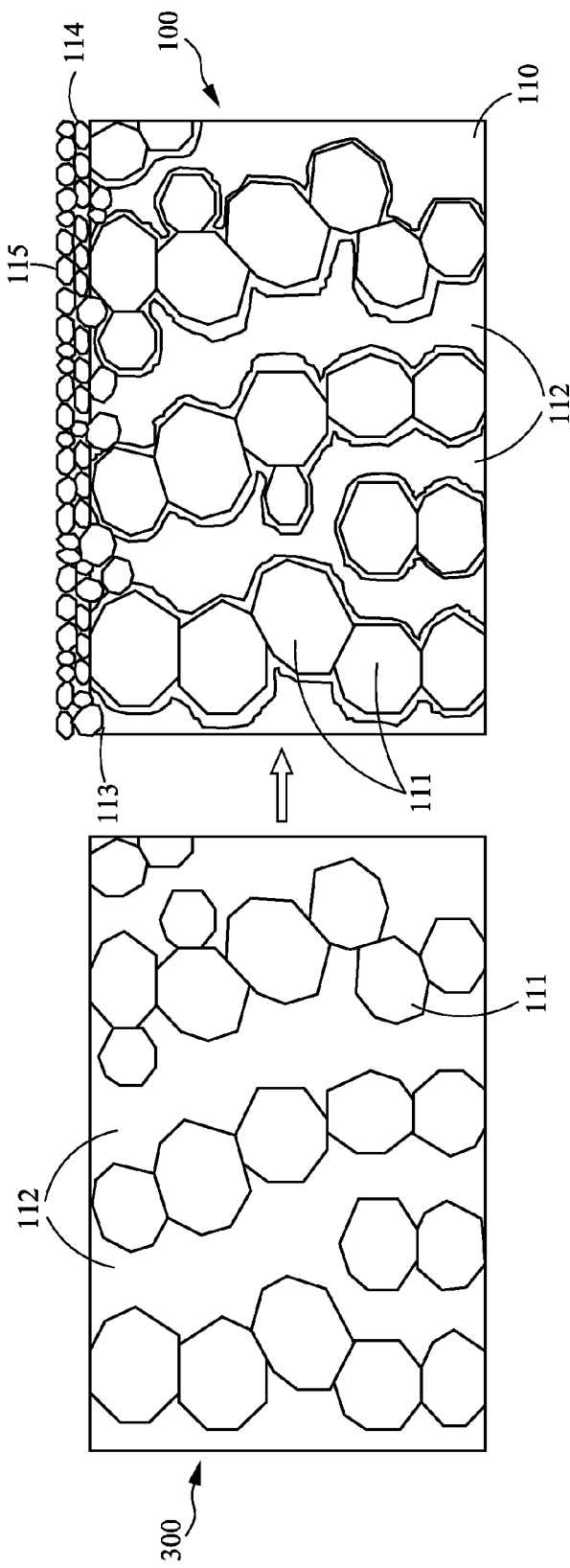
FIG. 2B is a schematic diagram for comparison between the porous Ni plate and the porous metal substrate for supporting SOFC function layers.
Figure 2C:
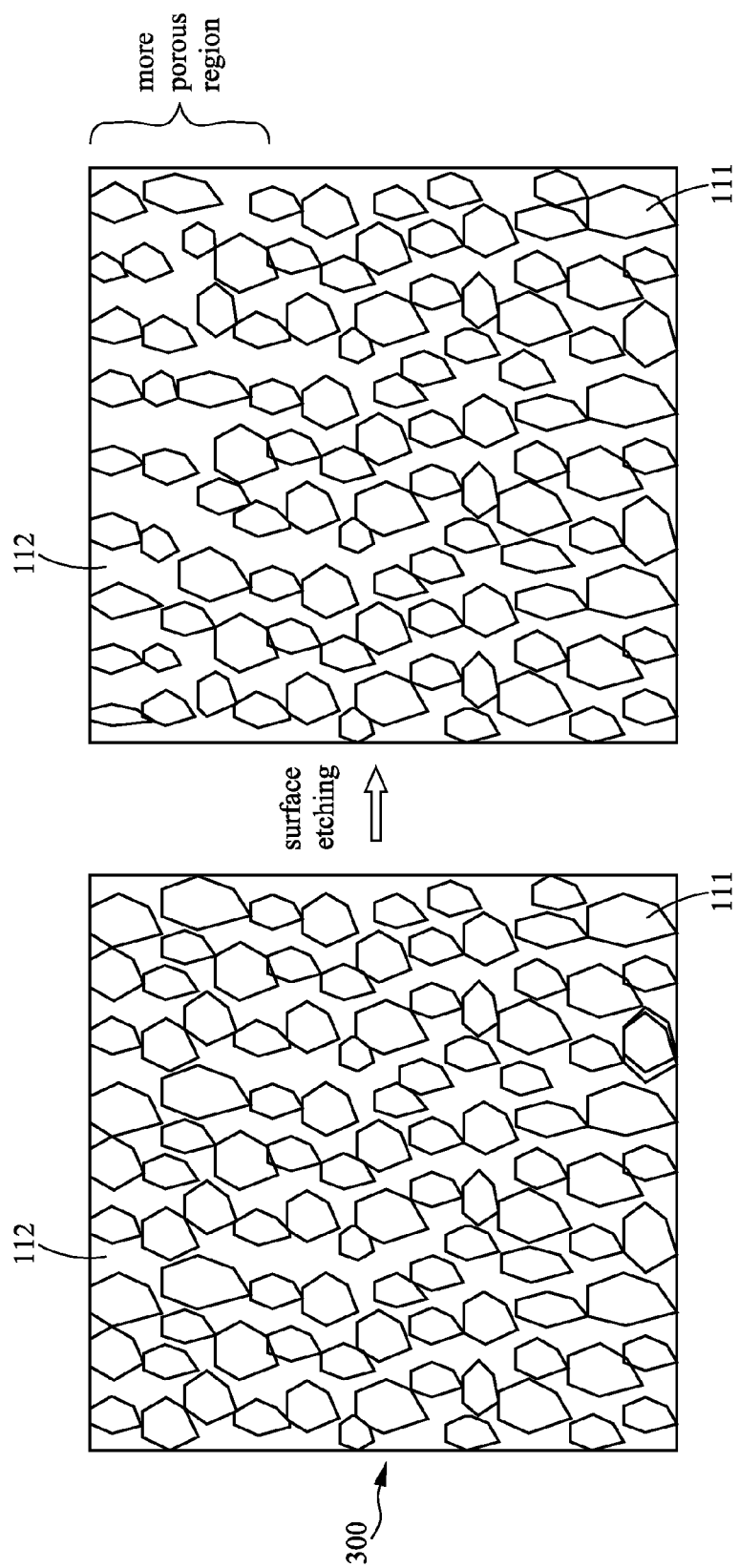
FIG. 2C is the schematic diagram to show a modified porous Ni plate with a more porous surface region before impregnating iron (Fe).

FIG. 2B is a schematic diagram showing transition from the Ni plate 300 after the Step 204 to the porous metal substrate 100 after the Step 209 and a reduction process. The surface of Ni substrate 300 after the Step 204 can be further etched to be more porous than the inside of Ni substrate 300, as shown in FIG. 2C. The porous region has a depth less than 150 μm and a porosity which is 1.4 to 1.8 times of the inside of porous Ni plate 300. After the surface etching, the steps after Step 205 are continued. By having the more porous region as shown in FIG. 2C, the stress due to the thermal expansion mismatch between the porous metal substrate 300 and any functional layer coated on the porous metal substrate 300 can be further reduced.

Figure 3:
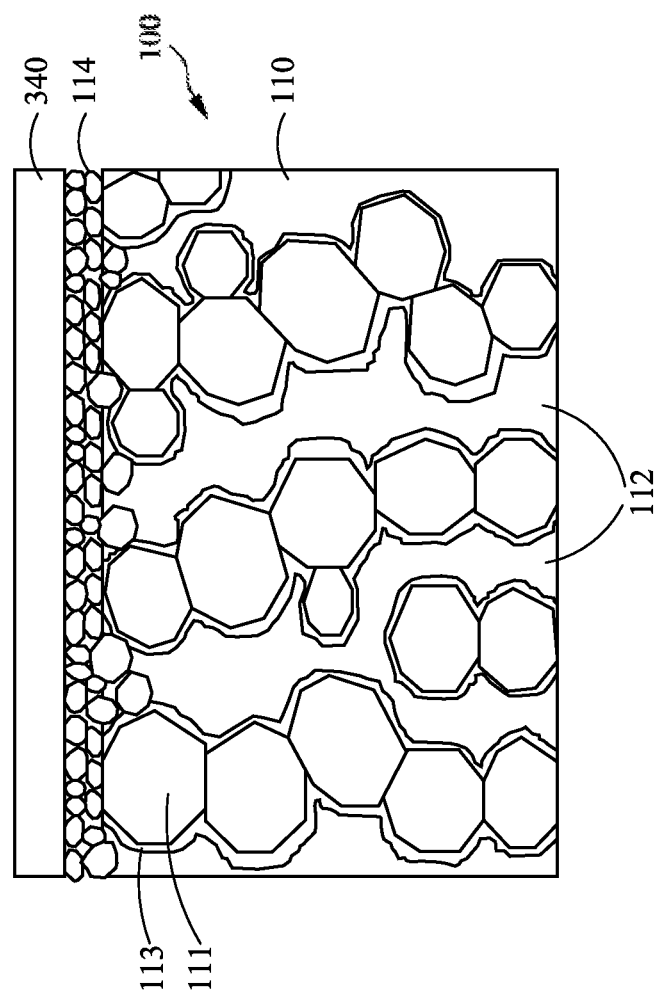
FIG. 3 is a schematic diagram showing a combination of the porous metal supporting substrate and a redox stable functional layer coated on the porous metal supporting substrate according to an exemplary embodiment.

An anode functional layer 340 may be further coated on the porous metal substrate 100 to form a combination of the support and the anode functional layer of solid oxide fuel cells. In one exemplary embodiment, a redox stable anode functional layer 340 of LSCM, or $Sr_{0.86}Y_{0.08}TiO_3$, or $La_{0.33}Sr_{0.56}TiO_3$ as shown in FIG. 3 is coated on the porous metal substrate 100 by a high-voltage high-enthalpy Ar—He—$H_2$ atmospheric-pressure plasma spraying process. Here, the anode functional layer 340 provides a resistance for oxygen passing through it and enhances the leakage oxygen to be absorbed by the porous shells (containing iron and nickel particles) of metal particles constructing the porous metal supporting substrate 100 for solid oxide fuel cells. The second metal particles of the porous metal film 114 can also have a shell containing iron and nickel particles by the same impregnating, oxidation and reduction processes mentioned above.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for fabricating a porous metal substrate structure to support functional layers of a solid oxide fuel cell (SOFC), comprising:
   providing first metal particles or a first metal slurry formed of the first metal particles, second metal particles or a second metal slurry formed of the second metal particles, a solution containing Fe and an acid solution, wherein a size of each of the first metal particles is larger than a size of each of the second metal particles;
   forming an un-sintered green metal plate formed of the first metal particles or the first metal slurry;
   forming a porous metal plate by sintering the un-sintered green metal plate;
   etching the porous metal plate by the acid solution to increase gas-permeability of the porous metal plate;
   forming an Fe impregnated porous metal plate by impregnating the solution containing Fe into the porous metal plate by a vacuum means, and then sintering the Fe impregnated porous metal plate at a temperature higher than 1100° C. in a reducing or vacuum atmosphere, until a content of Fe in the Fe impregnated porous metal plate reaches about from 6 wt % to 15 wt %;
   sanding the Fe impregnated porous metal plate and etching the Fe impregnated porous metal plate to clean a surface of the Fe impregnated porous metal plate and enhance permeability of the Fe impregnated porous metal plate by the acid solution;
   coating a porous metal film on the Fe impregnated porous metal plate to form a porous metal substrate by depositing the second metal particles on the Fe impregnated porous metal plate via a powder covering means or pasting the second metal slurry on the Fe impregnated porous metal plate, and then sintering the second metal particles or second metal slurry onto the Fe impregnated porous metal plate at a temperature higher than 1100° C.
   oxidizing the porous metal substrate so as to shrink pore sizes of the porous metal film; and
   forming porous shells containing Fe on surfaces of the first metal particles in the porous metal substrate by treating the oxidized porous metal substrate in a reduction atmosphere at a temperature higher than 700° C..

2. The method of claim 1,
   wherein the porous shells contain Ni and Fe elements, and Fe element is richer than Ni element in the porous shells.

3. The method of claim 1, wherein the porous metal substrate is oxidized at a temperature less than 800° C. in standard atmosphere and the pore sizes of the porous metal film are shrunk to less than 35 µm.

4. The method of claim 1, wherein the first metal particles comprise Ni and have sizes ranging from 60 µm to 250 µm.

5. The method of claim 1, wherein each of the second metal particles comprises Ni, a Ni—Fe mixture or a Ni—Co—Fe—Cu mixture, and has a size within a range from 20 µm to 60 µm, and a content of Fe of the Ni—Fe mixture is within a range from 6 wt % to 50 wt %.

6. The method of claim 1, wherein the first and second metal slurries are formed by respectively mixing the first and second metal particles with organic binder and solvent, wherein the organic binder and the solvent are polyvinyl alcohol and water or polyethyl cellulose and α-terpineol, respectively.

7. The method of claim 5, the second metal particles further comprise a material selected from the group consisting of Co, Pd and Ru.

8. The method of claim 1, wherein the step of forming the un-sintered green metal plate comprises:

placing the first metal particles or the first metal slurry into a mold, and then pressing the first metal particles or the first metal slurry until the un-sintered green metal plate is formed.

9. The method of claim 1, wherein the sintering process for forming the porous metal plate is selected from the group consisting of a vacuum sintering process, a vacuum hot-press sintering process, and a reducing atmosphere sintering process.

10. The method of claim 1, wherein the sintering process for forming the porous metal film is selected from the group consisting of a vacuum sintering process and a reducing atmosphere sintering process.

11. The method of claim 1, wherein the process of etching the porous metal plate by the acid solution to increase gas-permeability of the porous metal plate further comprises:

etching a surface of the porous metal plate, so that the porous metal plate has a surface region that is more porous than the inside of the porous metal plate, wherein the surface region has a depth less than 150 µm and a porosity which is 1.4 to 1.8 times of the inside of the porous metal plate.

\* \* \* \* \*